L. C. NICHOLSON.
PROTECTIVE SYSTEM FOR ELECTRICAL TRANSMISSION LINES.
APPLICATION FILED JAN. 26, 1912.

1,201,610.

Patented Oct. 17, 1916.
6 SHEETS—SHEET 1.

Fig. 1

L. C. NICHOLSON.
PROTECTIVE SYSTEM FOR ELECTRICAL TRANSMISSION LINES.
APPLICATION FILED JAN. 26, 1912.

1,201,610.

Patented Oct. 17, 1916.
6 SHEETS—SHEET 3.

L. C. NICHOLSON.
PROTECTIVE SYSTEM FOR ELECTRICAL TRANSMISSION LINES.
APPLICATION FILED JAN. 26, 1912.

1,201,610.

Patented Oct. 17, 1916.
6 SHEETS—SHEET 4.

Witnesses:

Inventor
Lloyd C. Nicholson
By his Attorneys
Kenyon & Kenyon

L. C. NICHOLSON.
PROTECTIVE SYSTEM FOR ELECTRICAL TRANSMISSION LINES.
APPLICATION FILED JAN. 26, 1912.

1,201,610.

Patented Oct. 17, 1916.
6 SHEETS—SHEET 6.

Witnesses:
George Schlett

Inventor
Lloyd C. Nicholson
By his Attorneys
Kenyon & Kenyon

UNITED STATES PATENT OFFICE.

LLOYD C. NICHOLSON, OF BUFFALO, NEW YORK.

PROTECTIVE SYSTEM FOR ELECTRICAL TRANSMISSION-LINES.

1,201,610.

Specification of Letters Patent.

Patented Oct. 17, 1916.

Application filed January 26, 1912. Serial No. 673,673.

*To all whom it may concern:*

Be it known that I, LLOYD C. NICHOLSON, a citizen of the United States, and a resident of Buffalo, county of Erie, State of New York, have invented certain new and useful Improvements in Protective Systems for Electrical Transmission-Lines, of which the following is a specification.

My invention relates to improvements in protective systems for electrical transmission lines, and is more especially directed to improvements in that kind of a system shown and described in my co-pending application, Serial No. 617,634, filed March 29th, 1911.

One object of the present invention is the perfection of an automatic switch for such a system, which is capable of closing quickly through a long air gap made necessary by the high voltage of the system, and one which will reset itself after normal load conditions are restored.

A further object of the invention is to provide a plurality of fuses and means for causing their automatic replacement in such a system.

A further advantage of the invention is that all apparatus is in the high tension part of the system, and its location is therefore independent of station and local low voltage circuits.

A further object of the invention is to provide suitable relay apparatus for the automatic switch, so that the automatic switch will not only close quickly, but so as to prevent certain disadvantageous results due to the action of the heavy alternating current upon the switch parts.

A further object of the invention is to provide an automatic switch responsive to changes in the electrostatic condition of the line, due to the occurrence of an arc on the line, as well as to other changes in the electrical condition of the system, due to the same cause.

A further object of the invention is to provide a simple and efficient form of apparatus for the purposes in question, and a system which is not liable to get out of order, and which is safe and reliable.

Further objects, features and advantages will more clearly appear from the detailed description given below, taken in connection with the accompanying drawings which form a part of this specification.

Referring to the drawings.

Figure 1:
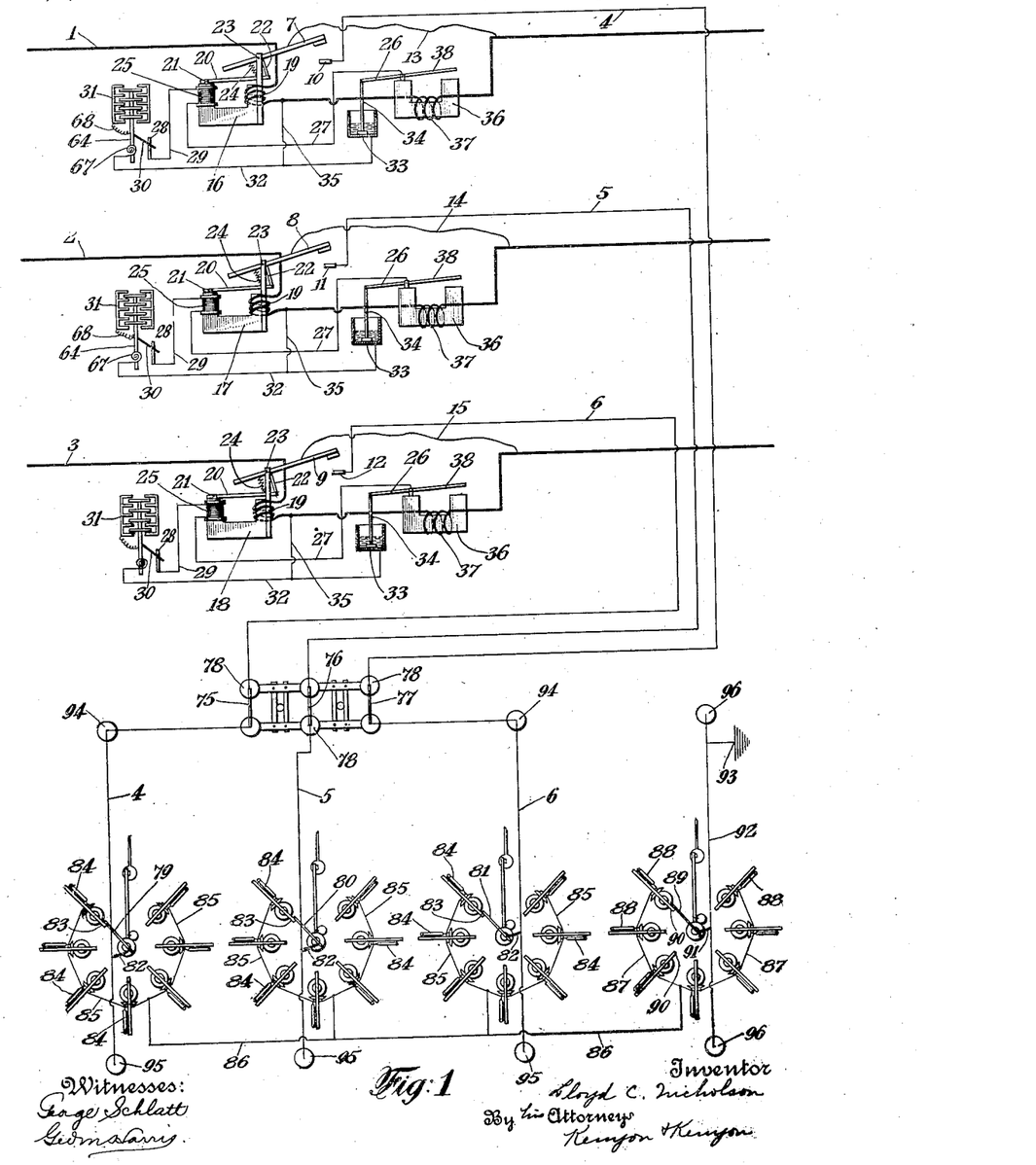
Figure 1 is a view, mostly diagrammatic, illustrating a system embodying my invention in one form.

Referring to the drawings, and more especially to Fig. 1, 1, 2 and 3 represent different phases of high tension polyphase transmission lines, the load being connected to the right hand end of the lines, and the power supply, to the left hand end of the lines. 4, 5 and 6 represent connections leading respectively from the transmission lines 1, 2 and 3, and suitably connected to ground, as more fully hereinafter described. 7, 8 and 9 represent automatic switches adapted to coöperate with fixed contacts 10, 11 and 12, in order to connect the circuits 4, 5 and 6 with the transmission lines 1, 2 and 3, by means of flexible conductors 13, 14 and 15, respectively. For operating the switches 7, 8 and 9 I provide transformer electromagnets 16, 17 and 18, provided with energizing or primary coils 19, connected in series with the transmission lines 1, 2 and 3, respectively. Electromagnets 16, 17 and 18 are provided with armatures 20, pivoted at 21. The armatures 20 have pivotally connected at their opposite ends, links 22, the opposite ends of which links are pivotally connected to the switch arms 7, 8 and 9, respectively. The switch arms 7, 8, 9, are pivoted as at 23, and the switches normally held open by springs 24. Wound on the same core of the electromagnets, as the coils 19, are secondary coils 25. One terminal of the coils 25 is connected to a switch arm 26 by means of conductor 27. The other terminal of the coils 25 is connected to a fixed contact 28 by means of conductor 29. Fixed contact 28 is adapted to coöperate with a movable switch contact 30, operated by an electrostatic relay 31. Contact 30 is electrically connected to a conductor 32 which leads to a contact 33 coöperating with a movable switch contact 34, electrically connected to the switch arm 26. A conductor 35 electrically connects the main lines 1, 2, and 3, respectively, with the conductors 32, whereby the electrostatic relay 31 is raised to the potential of its respective line. 36 represents an electromagnet provided with operating coil 37 in series in the transmission line. The electromagnets 36 operate upon armatures 38, which operate switch arms 26 and contacts 34 in order to open circuits between the contacts 34 and 33.

Figure 2:
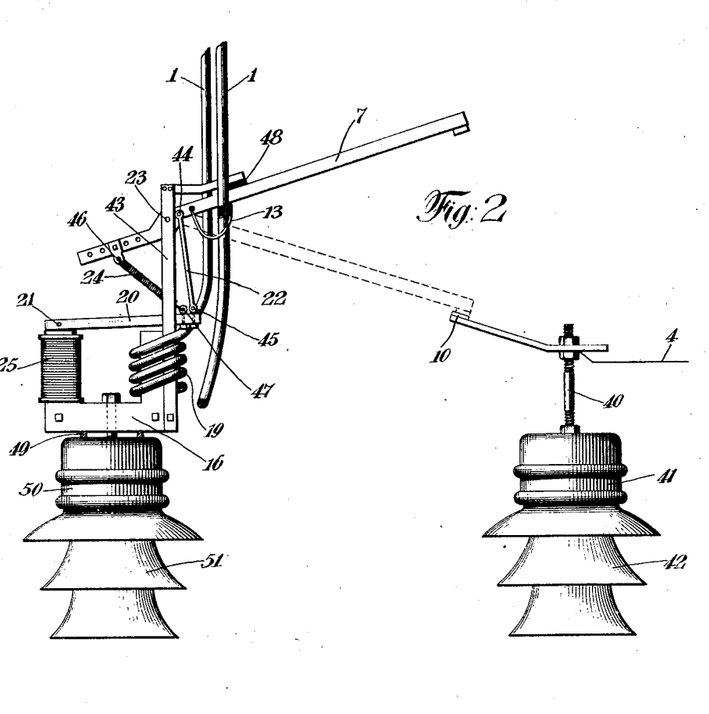
Fig. 2 is a detail elevation showing the automatic switch.
Figure 3:
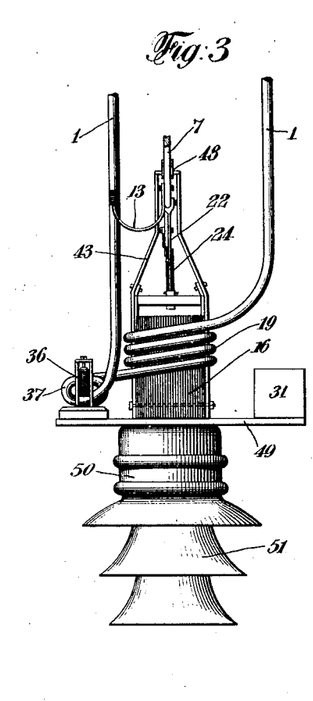
Fig. 3 is a detail elevation of parts shown in Fig. 2, taken at right angles to Fig. 2.
Figure 4:
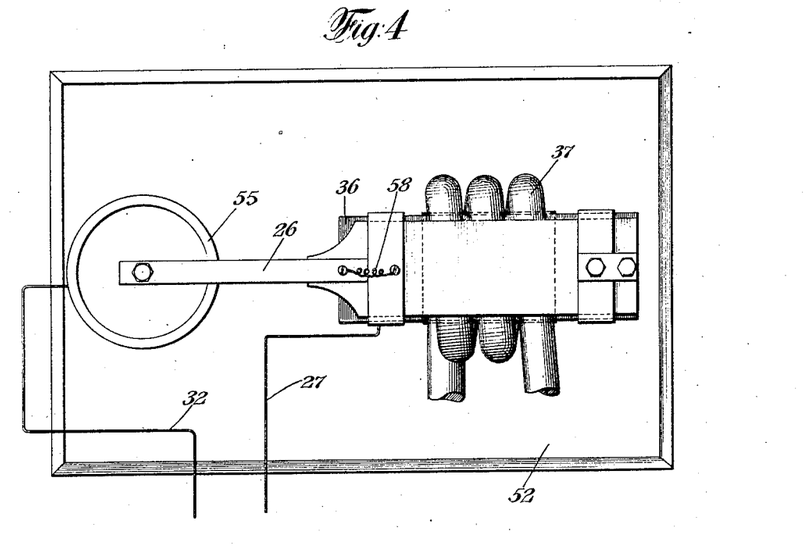
Fig. 4 is a plan view of the electromagnetic relay.
Figure 5:
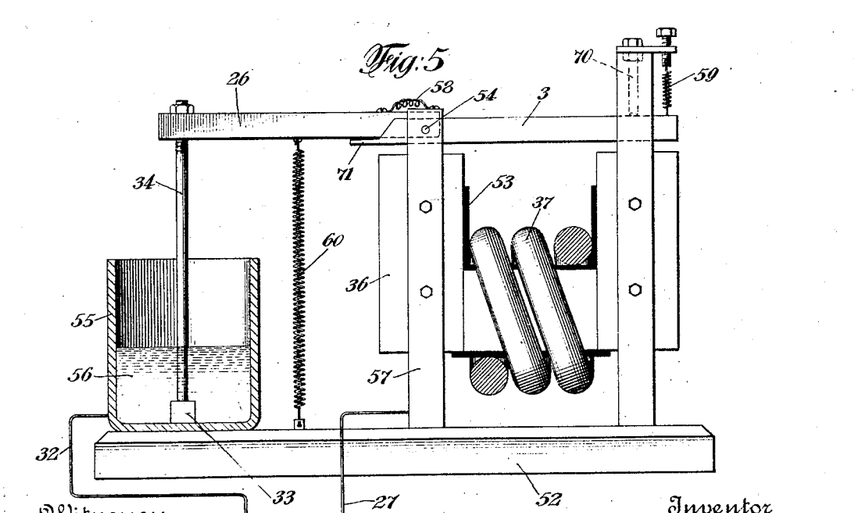
Fig. 5 is an elevation partly in section, of parts shown in Fig. 4.

Referring more particularly to Figs. 2 and 3, the actual construction of the switches 7, 8, and 9, are more clearly illustrated. As there shown the contact 10 is supported by an iron rod 40, in turn carried by an iron cap 41, on top of the high potential insulator 42. The switch arm 7 is pivoted to an upright 43 at 23, and the link 22 is connected to the switch arm 7 at 44, and to the armature 20 at 45. The spring 24 is adjustably connected to one end of the switch arm 7, as at 46, while the other end of the spring is connected to the other end of the armature 20, as at 47. A rubber stop is provided at 48 in order to limit the upward movement of the switch arm 7. The electromagnet 16 is well laminated, as shown in Fig. 3, and the transmission line 1 is connected to the switch arm by means of flexible conductor 13. All of these parts are supported upon a suitable base 49, in turn carried upon the top of an iron cap 50 on the high tension insulator 51. Also carried upon the support 49 is the electromagnet 36 having its core well laminated, as shown in Fig. 3. Also carried upon the base 49 is the electrostatic relay 31. The electromagnetic relay 36 is more clearly shown in Figs. 4 and 5. Referring to these figures, the electromagnet is there shown with its coil 37 supported on an auxiliary base 52, the turns of the coil 37 being insulated from the iron by means of suitable insulating material 53. The armature 38 is pivoted at 54 and carries on its left hand end the switch arm 26, which has rigidly connected therewith the switch contact 34. The switch contact 33 is placed in the bottom of the vessel 55, which contains oil 56, in order to insure quick break. The conductor 32 is connected to contact 33, through the vessel 55. The conductor 27 is connected to the switch arm 26 and contact 34, through the metallic upright 57 and wire 58. A spring 59 normally holds the armature 38 in its upward position, to allow the spring 60 to hold the switch contacts 34 and 33 in electrical connection with one another. A stop 70 limits the upward movement of the armature 38, and the switch arm 26 is pivotally mounted at 54. The armature 38, however, is provided with an arm 71 extending under switch arm 26, so that when the armature 38 is pulled down by the magnet, the arm 26 is raised, thereby separating switch contacts 33 and 34.

Figure 6:
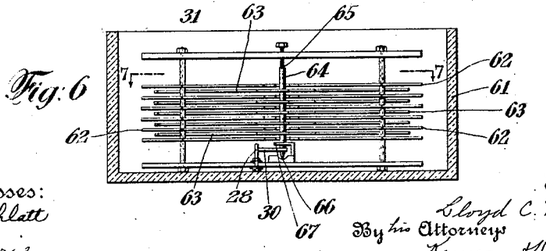
Fig. 6 is a sectional elevation of the electrostatic relay.
Figure 7:
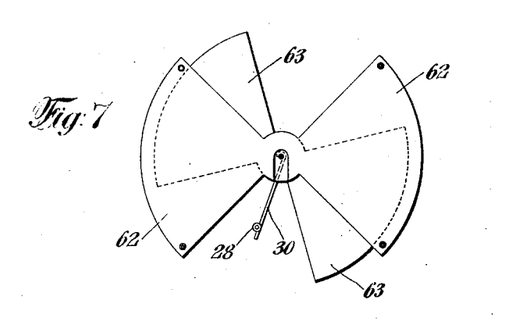
Fig. 7 is a detail plan view of the vanes of the electrostatic relay, shown in Fig. 6.

The electrostatic relay is more clearly shown in Figs. 6 and 7. This consists of a glass vessel 61, containing a set of fixed vanes 62, and a set of movable vanes 63 rigidly secured to a central pivot 64, having bearings at 65 and 66. The pivot pin 64 carries rigidly therewith the switch arm 30 which coöperates with the fixed contact 28. A spiral spring 67 normally tends to force the contact 30 away from the contact 28. The movable vanes 63 are electrically connected with the fixed vanes 62, in a suitable manner, as by wires 68 (see Fig. 1). Both sets of vanes are therefore electrically connected with the transmission line, as by conductors 35, 32, through the spring 67 and spindles 64, so that they are charged with electricity of like sign and repel one another against the action of the spring 67, whereupon the contacts 28 and 30 are forced together to close the circuit through the coil 25. The glass vessel 61 is suitably filled with oil which acts more or less as a damping medium to the movable vanes 63.

Figure 8:
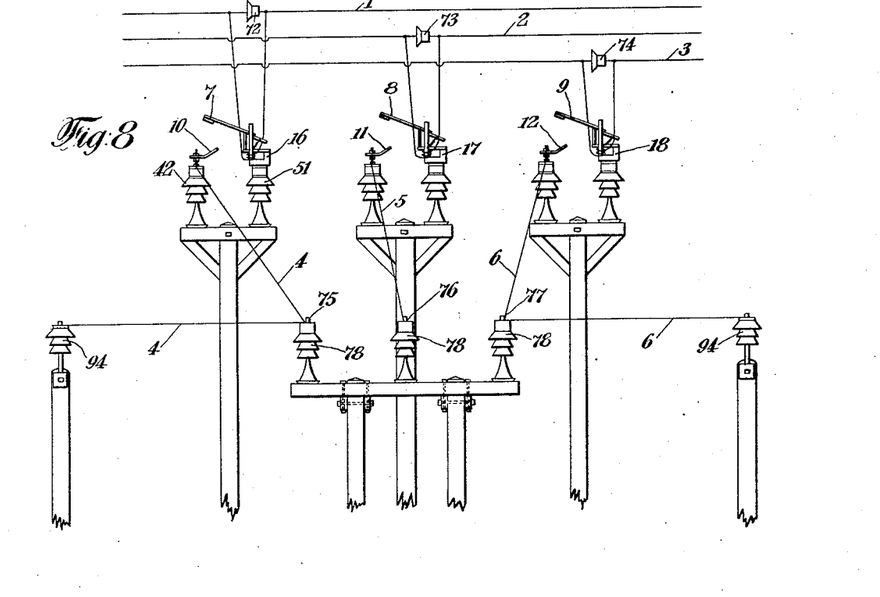
Fig. 8 is an elevation illustrating the manner in which the automatic switches and adjacent apparatus are mounted.

Referring to Fig. 8, I there show somewhat simply the actual arrangement of the switches 7, 8 and 9. As there shown, the coils 19 have their terminals connected on opposite sides of tension insulators 72, 73 and 74, respectively. From the contacts 10, 11 and 12, the connections 4, 5, and 6, lead to ordinary hand operated switches at 75, 76 and 77, respectively. (See also Fig. 1). These switches are carried upon high tension insulators 78. From the switches 75, 76 and 77, the connections 4, 5, and 6, are connected to rotating arms 79, 80 and 81, respectively, by means of flexible conductors 82. Each of the rotating arms 81 carries a contact adapted to make electrical connection with fixed contacts, as at 83, which are in turn electrically connected with inclosed fuses 84. Each of the rotating arms 79, 80 and 81 is adapted to be electrically connected with a plurality of fuses 84, as clearly shown in Fig. 1. The lower ends of the fuses 84 are electrically connected together by common conductors 85, and the conductors 85 forming part of the separate connections 4, 5 and 6, are electrically connected together by common connection 86. The connection 86 is electrically connected by means of conductors 87 to the bottom ends of a plurality of inclosed fuses 88. 89 represents a switch arm similar to the arm 81, adapted to make contact with electrical contacts 90, which are electrically connected respectively with the upper ends of fuses 88. The switch arm 89 is electrically connected by flexible conductor 91, with conductor 92, leading to ground at 93. The conductors forming connections 4, 5 and 6, are suitably supported on high tension insulators, at as 94, 78 and 95, and the conductor 92 forming part of the common connection, is suitably supported on high tension insulators 96.

The arrangement of fuses in the respective connections 4, 5 and 6, and in the common connection 86, 92, are the same, and the details of one of these arrangements of fuses is shown more clearly in Figs. 9 to 13 inclusive. Referring to the latter figures, 97 represents an upright post carrying brackets 98, in which is journaled an iron pipe or rod 99, carrying an iron pin 100 at its upper end. Rigidly secured to the pin 100 is a high potential insulator 101, upon the top of which is rigidly secured a rotating arm 81. The arm 81 is preferably formed of a piece of channel iron. 102 represents suitable supporting means upon which are carried high potential insulators 103, on the top of which are rigidly secured iron bars 104, carrying the contacts 83 electrically connected therewith. The fuses 84 are preferably inclosed in any well known manner, and mainly supported from the bars 104, and electrically connected therewith. The lower ends of the fuses 84 are connected to the conductors 85, which are secured to high potential insulators 105. Bolted upon the arm 81 is an electromagnet 106, provided with a suitable core operating a bell crank lever 107, journaled in the channel iron 81 at 108. To the opposite end of the bell crank lever 107 is rigidly connected a contact member 109, adapted to make electrical contact with the face of the contact 83. Upon energization of the solenoid 106 the bell crank lever is operated so as to raise the contact 109, as shown in dotted lines in Fig. 11, against the action of spring 110, connected to a depending arm 111, rigid with the bell crank lever 107. The solenoids 106 are connected in series in the connections 4, 5, and 6, and in the common connection 86, 92, respectively. A spring 111 tends to rotate the iron pipe 99 so as to force the contact 109 into engagement with the contact 83. If now the solenoid 106 be energized, the arm 109 will be lifted thereby, so as to assume the position shown in dotted lines in Fig. 11, whereupon the arm 81 will rotate under the action of spring 111 so that the contact 109 will slide over the top face 112 of the contact 83 (see Figs 12 and 13), and will come into electrical contact with the flange 113 of the contact 83, thus still maintaining the shunt circuit closed. Upon de-energization of the solenoid 106 the contact 109 drops down under the action of spring 110, through a slot 114, in the contact 83, whereupon the arm 81 is free to rotate farther, under the action of spring 111, and moves until its contact 109 strikes the next contact 83, which is in electrical connection with the next fuse 84.

Figures 9, 13:
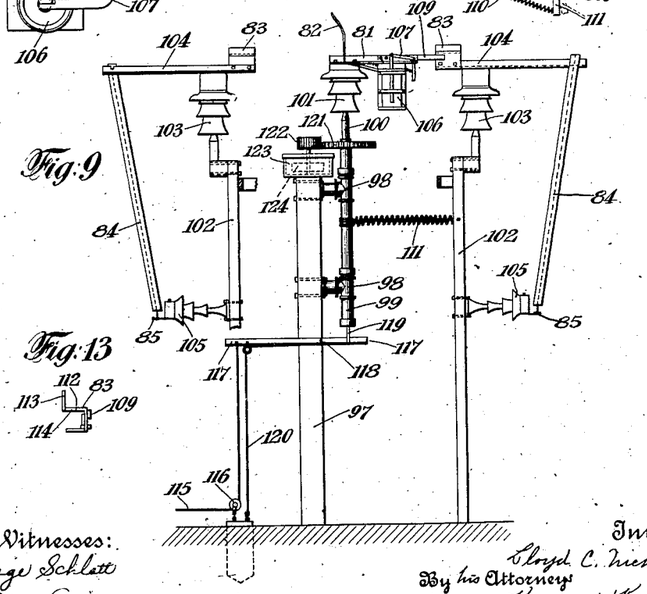
Fig. 9 is a detail elevation of one set of fuses, certain parts being broken away for the sake of clearness.
Fig. 13 is a detail showing the end construction of one of the contacts in electrical connection with the fuses shown in Figs. 9 and 10.
Figures 10, 11, 12:
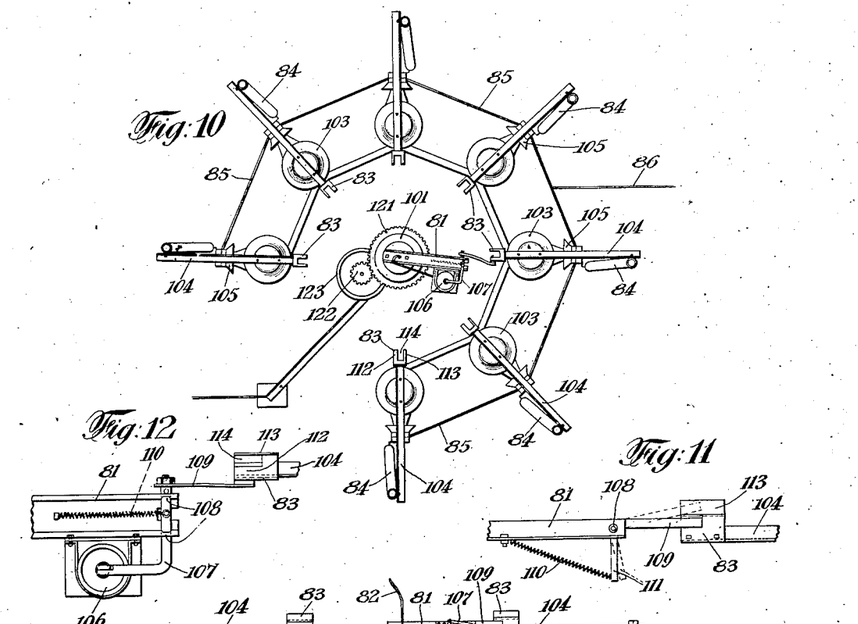
Fig. 10 is a plan view of one set of fuses.
Fig. 11 is a detail of the rotating arm and contact shown in Fig. 9.
Fig. 12 is a plan view of parts shown in Fig. 11, also including the electromagnet.

If it is desired to carry out the above operation by hand the rope 115 is pulled. The rope 115 passes about a pulley 116 and is connected to an iron bar 117 pivotally mounted on the post 97 at 118. Rigidly connected with the bottom of pipe 99 is a spindle 119, which bears upon one end of the lever 117. Therefore, upon pulling the rope 115 the spindle 119, together with pipe 99, insulator 101, rotating arm 81, are raised so that the contact 109 is raised until it is above the top face 112, whereupon the arm 81 rotates, as before explained. Upon releasing the rope 115 the contact 109 drops down by the weight of the various parts, so that the contact 109 drops through slot 114, as before explained, whereupon the contact 109 will pass to and electrically contact with the next contact 83. A rope 120 limits the downward movement of the parts. The pipe or rod 99 carries fixed thereto a gear 121, which meshes with a gear 122. The gear 122 is suitably journaled within a vessel 123, and has secured thereto within the vessel 123, a set of vanes 124. The vessel 123 is suitably filled with oil, so that the vanes operating within the oil, form a suitable damping means by which the rotating movement of the arm 81 is suitably damped.

The operation of the system is as follows: Supposing an arc to occur on the transmission line 1, as for instance, if a ground arc should be produced by lightning or other abnormal cause, then the abnormal current passing through the transmission line 1, and coil 37, causes the strength of coil 37 to be such that it will attract its armature against the action of springs 59 and 60, so that the armature will vibrate in synchronism with the alternations of the alternating current. This causes the contacts 33 and 34 to be separated, thus open circuiting the coil 25. When the coil 25 was short circuited, the current flow therein bucked out practically all the flux in the magnetic circuit of the magnet 17, so that the current in coil 19 would not sufficiently magnetize the iron to attract the armature 20. Upon the open circuiting of coil 25, the coil 19 will produce its maximum effect, which will be sufficient to strongly attract the armature 20, whereby the switch arm 7 is rapidly pulled downward to make electrical contact with contact 10. This closes a shunt circuit 4 around the arc on the line 1, which circuit contains flexible conductor 13, arm 7, contact 10, switch 77, arm 81, contact 83, fuse 84, conductor 85, conductor 86, conductor 87, fuse 88, contact 90, arm 89 and conductors 91 and 92 to ground at 93. As soon as this shunt circuit is closed it shunts the power current away from the arc which is on the line, so that the arc is rapidly extinguished before it has had time to do any material damage. It now remains to very quickly restore the line to its normal operating condition. This is accomplished by means of the fuse 88. The arc being to ground and the current being directed through the shunt circuit the fuse 88 or fuse 84 would immediately burn out as soon as the current is directed therethrough. Thus, immediately the arc is extinguished on the line, the fuse 88 or fuse 84 burns out, whereupon the shunt circuit is opened so that power is again fed into the line in a normal manner. The above operations take place so quickly that synchronous machinery is not thrown out of step, and before any damage has been done by the arc. Upon the current passing through the shunt connection 4 the solenoid 106 is energized, so that contact 109 is raised and comes into contact with the face 113 as above described. It remains in contact with the face 113 until the fuse 88 burns out, whereupon the solenoid 106 becoming deënergized, contact 109 drops through the slot 114, whereupon the spring 111 causes the contact 109 to engage the next contact 83, so that a new fuse 88 or 84 is connected in circuit to be ready to operate upon the occurrence of another arc on any one of the transmission lines 1, 2 or 3. Fuse 88 is not necessary when the ground current is sufficient to operate the electromagnetic relay, since usually fuse 84 would burn out with this amount of current, but in certain systems the ground current may be so small that it will not blow the fuse 84 nor operate the electromagnetic relay, and therefore the electrostatic relay is included in the system so that when the line conductor is grounded through an arc of small current the voltage of the line conductor to ground practically disappears, so that the electrostatic relay operates and the switch 7 is closed with only a small ground current, then the fuse 88 which is set to burn out at a much smaller current is important in order to open the shunt circuit on the occurrence of such small current therein. In such case fuse 84 acts as a conductor and does not blow out, nor does its repeating mechanism respond to the slight current flowing to ground through fuse 88. The repeating mechanism for fuse 88 does, however, respond to such current, this being accomplished by properly adjusting the number of turns on magnets 106.

The electrostatic relay acts responsive to abnormal voltage changes on the system due to the occurrence of the arc while the electromagnetic relay acts responsive to current changes on the line due to the occurrence of an arc. Thus if an arc occur between one line wire and ground on a delta connected system or on a star connected system with the neutral insulated from ground, the current changes would be so slight that the electromagnetic relay would probably not be actuated. The voltage of the line wire, or its electrostatic condition, would however be so varied as to cause the operation of the electrostatic relay and consequently the actuation of the switch 7 and the extinguishment of the arc.

If the arc be between two of the transmission lines, as between the lines 1 and 2, so as to form a short circuit between these lines, then abnormal changes in current will take place in these line wires so that the corresponding electromagnetic relays will operate and both of the switches 7 and 8 will close, due to the abnormal current in these lines, as before described, so that the connections 4 and 5 will be closed to form a shunt circuit around the arc embracing flexible connection 13, switch arm 7, contact 10, switch 75, arm 79, contact 83, fuse 84 in the connection 4, conductors 85 and 86, fuse 84 in the connection 5, switch 76, contact 11, switch arm 8, and flexible connection 14. As soon as this shunt circuit is closed the current of the arc, which is the power current which follows the breaking down of the insulation between the transmission lines, is shunted through this shunt circuit, and the arc extinguished, whereupon the solenoids 106 in the connections 4 and 5 will operate as above described, and after either the fuse 84 in the connection 4, or the fuse 84 in the connection 5, has been burned out, the switch arms 79 and 80 will rotate so as to connect the next fuse 84, in their respective circuits 4 and 5. Thus the fuses are automatically replaced. As soon as the fuse 84 burns out the currents in the lines 1 and 2 return to normal, whereupon the contacts 33 and 34 close, thereby very greatly decreasing the strength of the magnets 16 and 17, which has already been somewhat decreased by the decrease of abnormal current in coils 19 by its return to normal, so that the switches 7 and 8 are rapidly opened under the action of springs 24.

Figures 14, 15, 16:
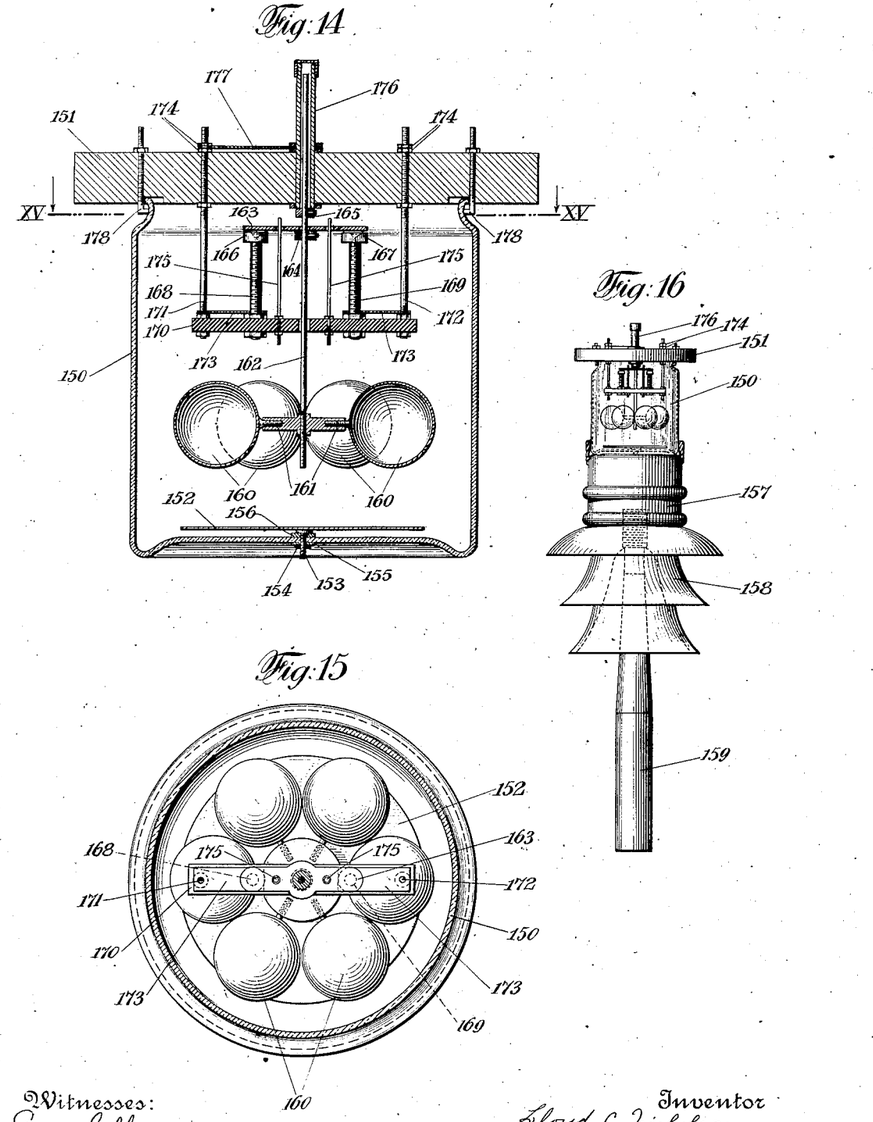
Fig. 14 is a vertical cross-section of a modified form of electrostatic relay.
Fig. 15 is a horizontal section taken on the line XV—XV of Fig. 14.
Fig. 16 is a detail view showing the mounting of the relay shown in Figs. 14 and 15.

Referring to Figs. 14, 15 and 16, I there show a modified form of electrostatic relay which is more powerful especially on low voltage than the one shown in Figs. 6 and 7. 150 represents a glass jar filled with oil and provided with a cover 151 of slate or other weather proof insulating substance. In the bottom of the jar is a metal plate 152 having rigid therewith a metal screw 153, passing through an oil tight joint in the glass and secured firmly in place by a nut 154, with intervening leather washers at 155 and 156. The jar is supported upon the iron cap 157 of an independent high potential insulator 158, and the screw 153 placed in electrical connection with the cap. The insulator 158 is carried by an iron pin 159, in the usual manner, which iron pin is connected to ground so that the plate 152 forms one electrode of the relay. The other electrode consists of a plurality of hollow metal balls 160 suspended in the oil and screwed to a circular disk 161 carried upon a spindle 162. Movement of the balls 160 with the rod 162 operates to lift or drop a metal contact bar 163 by means of two collars 164 and 165 rigid with the spindle 162, so that when the contact bar 163 is allowed to drop downwardly thereby, it closes the circuit through coil 25 by electrically connecting carbon contacts 166 and 167 screwed to metal posts 168 and 169 supported upon an insulating fiber block 170 in turn supported by brass rods 171 and 172 carried by the cover 151. Brass links 173 electrically connect the posts 168 and 169 with the rods 171 and 172, respectively, and the terminals of the circuit through coil 25, are connected to the rods 171 and 172, by means of binding nuts 174. Brass guide rods 175 carried by the block 170 pass upwardly and loosely through holes in the bar 163, in order to properly guide the same and keep it in alinement with the contacts 166 and 167. The rod or spindle 162 passes loosely through a hole in the block 170 and is also guided in a brass pipe 176 fixed in the cover 151. A brass strap 177 connects the rod 171 with the pipe 176, so that the balls 160 are raised to the potential of the line through the disk 161, rod 162, pipe 176, strap 177, and terminal at 174. The balls 160 tend to float so that a force is produced which opposes the electro-attractive force between the balls and the plate 152, due to the charging of these with electricity of unlike sign, so that when the potential of the line drops below a certain value the balls rise, raising the bar 163 and opening the circuit through the coil 25. Clamps 178 hold the cover 151 securely on the jar.

In case the polyphase system should be one in which the neutral is grounded through a very high resistance, it might occur that the ground current forming the arc would be so small that it would not operate the relay 36, as above described, so as to open circuit coil 25 in order to cause the switch 7, 8 or 9, as the case might be, to close. If, however, the line 1 was grounded by an arc, and a neutral was grounded through such a high resistance that the abnormal current was not sufficient to operate the switches, as above described, then the electrostatic relay 31 would operate to open circuit the coil 25. When the alternating current transmission lines are operating under normal conditions the high tension of the lines so polarizes the fixed and movable vanes of the electrostatic relay 31 that the contacts 28 and 30 are forced together to close the circuit through the coil 25. If, as above suggested, the condition is such that by reason of the power connections of the system a relatively small current flows to ground when one conductor is grounded, as compared to the current setting of the electromagnetic relay, as for example in a delta connected high tension system where a ground on one phase would allow a certain charging current to flow to earth which in itself would be too small an excess over normal conditions to cause the electromagnetic relay to open its contact, or, for example, on a star connected high potential system with the neutral ungrounded or grounded through a high limiting resistance, then the electrostatic relay holds the contacts 28 and 30 closed, as long as the voltage of its line is say half normal, but when the conductor becomes grounded by such an arc the potential difference between the line and ground practically disappears, so that the contacts 28 and 30 are separated by the spring control and the secondary coil 25 open circuited, so that the switch 7, 8, or 9, as the case may be, will close either by the effect of the normal load current or the ground current, or a combination of the two. It is not claimed that any very rapid action can be obtained in this manner, but neither is such action especially important at such time, since the operation of the system is not disturbed by such grounds remaining on for a short length of time.

It will thus be seen that two relays are provided, one responsive to current changes in the line, the other responsive to changes in the voltage or electrostatic condition of the line, so that the shunting of the arc takes place whether the arc be between one line conductor and ground, or between two line conductors, and also whether the sending station be star connected with the neutral substantially grounded, or whether it be star connected with the neutral substantially insulated, or whether it be delta connected.

The switch arms or blades 7, 8 and 9, are preferably made of an aluminum alloy, giving them lightness and strength. The springs 24 are connected between the armatures 20 and the movable switch arms, so that their elongation is very much more than the motion of the armature. This effects a comparatively light controlling force when the switch is open and there is an air gap in the magnetic circuit, and a very strong restoring force when the armature is down upon the magnet when the switch is closed. This strong spring tension is important, since the attraction exerted by the load current on the armature in its down position is far more than the attraction produced by the same current in the open position.

It will be seen that the switches 7, 8 and 9, are very important, and are arranged to remain open under all normal load conditions, and to close very swiftly when a phase to phase arcing short circuit, or a ground, occurs on the line, diverting the current from the line into the fuses, to remain in their closed position until the fuses have burned out, and to open immediately afterward so as to be immediately ready for a repetition as soon as new fuses are cut in. The electromagnetic and electrostatic relays are also of great importance, although not absolutely necessary to some features of my invention. Without them, and with the coils 19 arranged to operate the switches by variations in the current directly, it is found that severe vibration caused by the normal load current rapidly deteriorates the bearings, as at 23, 44, 45 and 21. This vibration is caused by the periodicity of the alternating current giving impulses to the armature. It is also found that without the relays it is impossible to give the switch a setting safe for ordinary load current and still have it operate quickly on short circuits when the short circuits are a long distance from the power house. Thus the switch would have an inverse time element, that is, the time required for closing would be dependent upon the location of the short circuit. This is undesirable particularly when it is attempted to make two or more sets of switches operate in unison at different generating stations which feed into the same transmission lines. A further objection is that the tension of the springs 24 must necessarily be so great in order to keep the switch open under normal currents and to restore it after operation, that the speed of the switch when closing is slackened considerably thereby. This is all on account of the relatively large force which the normal load current causes to act upon the armature. Furthermore, without the relays the tightness of the springs 24 causes the contacts of the switches to separate a short distance for that portion of the cycle which is not sufficiently strong to work against the spring tension. This causes the contacts to separate an inch or so and close again each half cycle, while the fuses are burning out, and so introduces vicious short arcs which rapidly burn away the metal of the contacts, and also introduces arcs in series with the fuses. But by providing the electro-magnetic relay above described, the above disadvantages are overcome. The secondary coil 25 when closed by the relay contacts at 33 and 34, and 28 and 30, under normal load conditions, has generated in it a voltage and current by reason of the excitation of the magnets 16, 17, or 18, as the case may be, by normal load current in the primary 19. The fact that the phase of current in coil 25 is practically opposite to that in the coil 19, effects a magneto motive force opposed to that in the coil 19, so that as long as the contacts at 33 and 34, and 28 and 30 are closed the magnetic pull on the armature 20 corresponding to the normal load current in the coil 19, is very slight and does not amount to over a few per cent. of the force exerted by the primary coil carrying normal load current when the secondary coil 25 is open circuited. By this arrangement the inverse time element of the switch is avoided because the primary coil 19 may now be given sufficient turns to cause complete magnetic saturation under the mildest short circuit conditions which can occur, as when the short circuit is at the distant end of the transmission line. Furthermore, the tension of the spring 24 may be only a small part of what it would have to be without the secondary coil 25, and this evades the serious objections of slackening the speed of closing the switches, and the periodic closing and opening of the switches 7, 8 and 9, with subsequent burning away of metal. The electromagnetic and electrostatic relays also allow the switches 7, 8, and 9, to open very quickly. The armature of the electromagnetic relay by proper adjustment of the springs 59 and 60, may be easily made to vibrate between the magnet and stop 70, responsive to a certain definite current through the coil 37, so that there is no practical difference between the amount of current which will cause it to vibrate and that at which it will just cease to vibrate. This vibration insures that the relay has a perfectly definite current setting at which it will begin to vibrate synchronously with the alternations of the system, and that it will cease vibration when the current has dropped to substantially the same value. Thus by means of this relay the value of current to departures from which the switches are responsive, may be made definite and the switches caused to operate, upon slight changes from the predetermined current value. It will of course be understood that with normal load current the contacts 33 and 34 remain closed, but that upon currents of the arc and abnormal load current occurring, the switch contacts 33 and 34 are separated in order to open circuit the coil 25.

It will be noted that all of the coils in any way connected with the operating of the switches 7, 8 and 9, are connected in or supplied by the high tension lines so that all the apparatus is entirely segregated from any low tension apparatus whatever. Furthermore, the shunt circuits 4, 5 and 6, upon the closing of the switches, are connected to the lines on the load side of the coils 37 and 19, so that these coils remain sufficiently energized to hold down their armatures until the fuses have burned out.

As to the time consumed by the automatic switches 7, 8 and 9, to operate to close, say, a 14 inch gap, I find that the relay 36 requires from 1/100 to 1/50 second, and the switch 7, 8, or 9, about the same, making a total of from 1/50 to 1/25 second for the complete operation, which on a 25 cycle system is from 1/2 to 1 cycle. This represents the time that the arc remains on the line. It will therefore be seen that the apparatus operates with extreme quickness. It will further be seen that by supporting the magnets 16, 17 and 18, upon high potential insulators, and the contacts 10, 11, 12, also on high potential insulators, the two contacts of the switches are properly insulated from one another to withstand the high voltage of the system. The insulators should preferably be such as to insulate the contacts sufficiently to withstand about 10,000 volts or more. It will also be seen that I have provided a simple arrangement of sets of a plurality of fuses in each of the shunt connections, the two terminals of each fuse being insulated from one another by being supported upon high potential insulators sufficient to withstand about 10,000 volts or more, so that the terminals are sufficiently insulated to withstand the high potential of the system after the fuse has burned out. It will also be clear that the throwing into connection of one fuse in any of the circuits 4, 5, or 6, after another fuse has blown out, is purely automatic, and done quickly, so that if after the burning out of the first fuse the arc has not been extinguished, the shunt circuit will again be closed through another fuse automatically, whereupon the current will be again shunted from the arc for the purpose of extinguishing the same, and the operation repeated. The inclosed fuses are especially adapted for the purposes in question and it is especially important that means be provided for automatically resetting them, since it often happens in electric storms that several arcs or short circuits will follow one another in quick succession upon the line or lines.

Although I have described my improvements in great detail and with respect to one particular form of the invention, nevertheless I do not desire to be limited to the details shown and described, except as clearly specified in the appended claims, since many changes and modifications may well be made without departing from the spirit and scope of my invention in its broadest aspects.

Having fully and clearly described my improvements in one form, what I claim as new and desire to secure by Letters Patent is:

1. A system for extinguishing arcs on transmission lines comprising in combination with the transmission line, a connection for shunting arcs occurring on the line, said connection having a fuse and a switch in series therein, and means for operating said switch responsive to changes in the electrical condition of the system due to the arc, to close the connection to shunt the arc and cause the fuse to open the connection, said switch automatically opening the connection when the fuse opens the connection.

2. A system for extinguishing arcs on high tension transmission lines comprising in combination with the high tension transmission line, a connection for shunting arcs occurring on the line, said connection having a fuse and switch in series therein, said switch having its two switch contacts insulated from one another sufficiently to withstand about 10,000 volts or more, and means for operating the switch responsive to current changes due to an arc on the line, to close the connection to extinguish the arc, and open the connection responsive to the operation of the fuse to open the connection.

3. A system for extinguishing arcs on high tension transmission lines comprising in combination with an alternating current high tension transmission line a connection for shunting arcs occurring on the line, said connection having a fuse and switch in series therein, and electromagnetic means for causing the switch to close responsive to current changes due to an arc on the line, whereby the current is directed through said fuse to extinguish the arc, said fuse being constructed to burn out upon the passage of the heavy current therethrough and said electromagnetic means being constructed to automatically open said switch responsive to the burning out of said fuse.

4. A system for extinguishing arcs on high tension transmission lines comprising in combination with an alternating current high tension transmission line a connection for shunting arcs occurring on the line, said connection having a fuse and switch in series therein, and means for closing the switch to shunt the current from the arc through the fuse, whereby the fuse will burn out after an arc occurs on the line so as to restore the line to its original condition, said means being constructed to open the switch responsive to the burning out of said fuse after the arc has been extinguished.

5. A system for extinguishing arcs on transmission lines comprising in combination with the transmission line, a connection for shunting the arc to extinguish the same, said connection having means therein adapted to close the connection responsive to electrical changes in the condition of the system due to the occurrence of an arc on the line, a plurality of fuses adapted to be connected in series in said connection, and means for automatically connecting another fuse in series in said connection after one fuse in said connection has burned out.

6. A system for extinguishing arcs on transmission lines comprising in combination with the transmission line, a connection for shunting the arc to extinguish the same, said connection having a switch adapted to close the connection responsive to electrical changes in the system due to the occurrence of an arc on the line, a plurality of fuses adapted to be consecutively connected in series in said connection, and means for automatically connecting one fuse in series in said connection after one fuse in said connection has burned out, said means operating responsive to current changes in said connection.

7. A system for extinguishing arcs on high tension transmission lines comprising in combination with the high tension transmission line, a circuit arranged to shunt an arc occurring on the line to extinguish the arc, said circuit having a switch in series therein, means for insulating the switch contacts from one another sufficient to withstand about 10,000 volts or more, means for operating the switch to close the circuit responsive to current changes due to the occurrence of an arc on the line, a plurality of inclosed fuses, means for insulating the ends of each fuse from one another sufficient to withstand about 10,000 volts or more, a switch arm for automatically connecting another fuse in said circuit after one fuse in said circuit has burned out, and means for operating said switch arm responsive to electrical changes due to the burning out of said one fuse.

8. A system for extinguishing arcs on high tension transmission lines comprising in combination with the high tension transmission line, a circuit arranged to shunt an arc occurring on the line to extinguish the arc, said circuit having a switch in series therein, means for operating the switch to close the circuit responsive to current changes due to the occurrence of an arc on the line, a plurality of inclosed fuses, and means for automatically connecting another fuse in said circuit after one fuse in said circuit has burned out, due to the current shunted therethrough, said last mentioned means operating responsive to electrical changes due to the burning out of said one fuse.

9. A system for extinguishing arcs on electrical transmission lines comprising in combination with an alternating current high tension transmission line, a connection for shunting an arc occurring on the line, a switch in series in said connection, means for operating said switch to close the connection, responsive to electrical changes in the system due to the occurrence of an arc on the line, a plurality of fuses adapted to be connected in series in said connection, and means for automatically connecting one fuse in series in said connection after another fuse in series in said connection has burned out, said switch operating means being arranged to open the switch automatically after the burning out of the fuse in series in said connection.

10. A system for extinguishing arcs on high tension transmission lines comprising in combination with the high tension transmission line, a circuit arranged to shunt an arc occurring on the line to extinguish the arc, said circuit having a switch in series therein, means for operating the switch to close the circuit responsive to current changes due to the occurrence of an arc on the line, a plurality of inclosed fuses, and means for automatically connecting another fuse in said circuit after one fuse in said circuit has burned out due to the current shunted therethrough, said last mentioned means operating responsive to electrical changes due to the burning out of said one fuse, said switch operating means being adapted to automatically open the switch after said one fuse has burned out, responsive to current changes in the system, due to the burning out of said fuse.

11. A system for extinguishing arcs on high tension transmission lines comprising in combination with the high tension transmission line a circuit arranged to shunt an arc occurring on the line to extinguish the arc, said circuit having a switch in series therein, means for insulating the switch contacts from one another sufficient to withstand about 10,000 volts or more, means for operating the switch to close the circuit responsive to current changes due to the occurrence of an arc on the line, a plurality of inclosed fuses, means for insulating the ends of each fuse from one another sufficient to withstand about 10,000 volts or more, a switch arm for automatically connecting another fuse in said circuit after one fuse in said circuit has burned out, and means for operating said switch arm responsive to electrical changes due to the burning out of said one fuse, said switch operating means being adapted to automatically open the switch after said one fuse has burned out, responsive to current changes in the system due to the burning out of said fuse, and said switch operating means embracing a controlling coil in series in the transmission line on the load side of said shunt circuit.

12. A system for extinguishing arcs on electrical transmission lines comprising in combination with the transmission line, a connection for shunting an arc occurring on the line, a switch for closing said connection to extinguish the arc, a coil for controlling the closing of said switch responsive to electrical changes in the system due to the occurrence of the arc, and a relay independently responsive to electrical changes in the system due to the occurrence of the arc, for varying the effect of said first mentioned coil on the switch.

13. A system for extinguishing arcs or electrical transmission lines comprising in combination with the transmission line, a connection for shunting an arc occurring on the line to extinguish the arc, and means acting upon the occurrence of an arc on the line, and responsive both to voltage changes and current changes on the line due to the occurrence of the arc, to close said connection to extinguish the arc.

14. A system for extinguishing arcs on electrical transmission lines comprising in combination with the transmission line, a connection for shunting an arc occurring on the line to extinguish the arc, and means acting upon the occurrence of an arc on the line, and responsive both to voltage changes and current changes on the line due to the occurrence of the arc, to close said connection to extinguish the arc, and means whereby said connection is automatically opened after the arc has been extinguished.

15. A system for extinguishing arcs on electrical transmission lines comprising in combination with the transmission line, a connection for shunting an arc occurring on the line to extinguish the arc, and means acting upon the occurrence of an arc on the line, and responsive both to voltage changes and current changes on the line due to the occurrence of the arc, to close said connection to extinguish the arc, and fuses adapted to automatically open said connection each time after an arc has been extinguished.

16. A system for extinguishing arcs on high tension transmission lines comprising in combination with a transmission line, a circuit for shunting the arc on the line, a switch for closing said circuit to extinguish the arc on the line, a coil for controlling the opening and closing of said switch in series in the line, a relay for regulating the action of said coil responsive to current changes in the line due to the occurrence of the arc on the line, and an electrostatic relay for regulating the action of said coil responsive to changes in the electrostatic condition of the line due to the occurrence of the arc on the line.

17. A system for extinguishing arcs on high tension transmission lines comprising in combination with the high tension transmission line, a circuit for shunting the arc on the line, and means for closing said shunt circuit to extinguish the arc responsive to current changes in the line due to the occurrence of an arc on the line, and responsive to changes in the electrostatic condition of the line due to the occurrence of an arc on the line.

18. A system for extinguishing arcs on electrical transmission lines comprising in combination with the transmission line, a connection for shunting an arc occurring on the line to extinguish the arc, a switch for closing said connection to extinguish the arc, means for causing the actuation of said switch responsive to abnormal current changes due to the arc, and means for causing the actuation of said switch responsive to abnormal voltage changes due to the occurrence of the arc, whereby the arc is extinguished responsive to either abnormal current changes or abnormal voltage changes due to the occurrence of the arc.

19. A system for extinguishing arcs on high tension transmission lines comprising in combination with an alternating current high tension transmission line, a circuit for shunting the arc on the line, a switch for closing said circuit to extinguish the arc on the line, an electromagnet for opening and closing said switch, said magnet having a main operating coil in series with the line and a second coil for cutting down the effect of the first mentioned coil, a switch for open circuiting the second coil to allow the effect of the first coil on the switch to be increased, and means for controlling the action of said second switch responsive to changes in the electrical condition of the system, due to the occurrence of an arc on the line.

20. A system for extinguishing arcs on high tension alternating current transmission lines having in combination, a connection for shunting the arc, a switch for closing the connection, an electromagnet for operating said switch, two coils on said magnet through which the magnetic flux passes, one of said coils being energized by alternating current and the other coil being normally closed circuited, whereby the magnet acts as a transformer, and means for opening the circuit of said last mentioned coil responsive to changes in the condition of the system due to the occurrence of the arc whereby the magnet will operate the switch to close the shunt connection and extinguish the arc.

21. A system for extinguishing arcs on high tension alternating current transmission lines, having in combination, a connection for shunting the arc, a switch for closing the connection, an electromagnet for operating said switch, two coils on said magnet through which the magnetic flux passes, one of said coils being energized by alternating current and the other coil being normally closed circuited whereby the magnet acts as a transformer, and means for opening the circuit of said last mentioned coil responsive to changes in the electrostatic condition of the line upon which the arc occurs, due to the occurrence of the arc, whereby the magnet will operate the switch to close the shunt connection and extinguish the arc.

22. A system for extinguishing arcs on high tension alternating current transmission lines, having in combination, a connection for shunting the arc, a switch for closing the connection, an electromagnet for operating said switch, two coils on said magnet through which the magnetic flux passes, one of said coils being energized by alternating current from one of the transmission line conductors and the other coil being normally closed circuited, whereby the magnet acts as a transformer, and means for opening the circuit of said last mentioned coil responsive to changes in the current in the line on which the arc occurs, due to the occurrence of the arc, whereby the magnet will operate the switch to close the shunt connection and extinguish the arc.

23. A system for extinguishing arcs on high tension transmission lines, comprising in combination with an alternating current high tension transmission line, a circuit for shunting the arc on the line, a switch for closing said circuit to extinguish the arc on the line, a coil for controlling the closing of said switch, a relay for controlling the action of said coil responsive to changes in the electrical condition of the system due to the occurrence of an arc on the line, a fuse in said circuit, said switch being adapted to open upon the burning out of said fuse.

24. A system for extinguishing arcs on electrical transmission lines comprising in combination with an alternating current high tension transmission line, a circuit for shunting an arc occurring on the line and connected to the line, a switch for closing said shunt circuit, a coil for controlling the action of said switch, and a relay for controlling the action of said coil, said coil and relay being connected to be supplied from the transmission line on the load side of said shunt circuit, and operative responsive to current changes in the line due to the occurrence of the arc on the line.

25. A system for extinguishing arcs on electrical transmission lines comprising in combination with an alternating current high tension transmission line, a circuit for shunting an arc occurring on the line and connected to the line, a switch for closing said shunt circuit, a coil for controlling the action of said switch, and a relay for controlling the action of said coil, said coil and relay being connected to be supplied from the transmission line on the load side of said shunt circuit, and operative responsive to current changes in the line due to the occurrence of the arc on the line, an electrostatic relay for also controlling the action of said coil responsive to changes in the electrostatic condition of the line due to the occurrence of an arc on the line, and a fuse in said shunt circuit adapted to burn out on the closing of said switch to restore the line to normal operating condition.

26. A system for extinguishing arcs on electrical transmission lines comprising in combination with a transmission line, a connection for shunting an arc on the line, means for closing the connection responsive to changes in the electrical condition of the system due to the occurrence of an arc on the line, a plurality of inclosed fuses adapted to be consecutively connected in said shunt connection, a rotatable switch arm having a contact for consecutively connecting the fuses in the shunt circuit, and a coil responsive to current changes in the shunt connection for causing the contact to move from connection with one fuse to connection with the next fuse.

27. A system for extinguishing arcs on high tension alternating current transmission lines, having in combination, a connection for shunting the arc, a switch for closing the connection, an electromagnet for controlling said switch, two coils on said magnet through which the magnetic flux passes, one of said coils being in series relation with one of the alternating current transmission line conductors, and the other coil being normally closed circuited, whereby the magnet acts as a transformer, and means for opening the circuit of said last mentioned coil responsive to changes in the condition of the system due to the occurrence of the arc, whereby the magnet will operate the switch to close the shunt connection and extinguish the arc.

28. A system for extinguishing arcs on polyphase high tension transmission lines, comprising in combination with the polyphase transmission lines, a separate connection from each transmission line, a common connection connecting the various separate connections with ground, a switch in each separate connection, a separate coil for controlling the opening and closing of each switch, a separate relay controlling the action of each coil to cause the switch to close, responsive to changes in the electrical condition of the system due to the occurrence of an arc on the phase to which its separate connection is connected, a plurality of fuses for each separate connection, separate means for consecutively connecting the fuses of each plurality of fuses in series in its separate connection, and a separate coil for each means for causing said means to operate to connect another fuse in series in the connection after one fuse in the connection has burned out, said coil operating responsive to current changes in its connection, and said relay being adapted to cause the switch to open upon the burning out of a fuse in its connection.

29. A system for extinguishing arcs on polyphase high tension transmission lines, comprising in combination with the polyphase transmission lines, a separate connection from each transmission line, a common connection connecting the various separate connections with ground, a switch in each separate connection, a separate coil for controlling the opening and closing of each switch, a separate relay controlling action of each coil to cause the switch to close, responsive to changes in the electrical condition of the system due to the occurrence of an arc on the phase to which its separate connection is connected, a plurality of fuses for each separate connection, separate means for consecutively connecting the fuses of each plurality of fuses in series in its separate connection, a separate coil for each means for causing said means to operate to connect another fuse in series in the connection after one fuse in the connection has burned out, said coil operating responsive to current changes in its connection, and said relay being adapted to cause the switch to open upon the burning out of a fuse in its connection, a plurality of fuses for said common connection, means for consecutively connecting said last mentioned fuses in series in said common connection, and a coil for causing said last mentioned means to operate to connect another fuse in said common connection after one fuse in said common connection has burned out.

30. A system for extinguishing arcs on electrical transmission lines comprising in combination with the transmission line, a connection for shunting an arc occurring on the line to extinguish the arc, a switch for closing said connection to extinguish the arc, means for causing the actuation of said switch responsive to abnormal current changes due to the arc, and means for causing the actuation of said switch responsive to abnormal voltage changes due to the occurrence of the arc, whereby the arc is extinguished responsive to either abnormal current changes or abnormal voltage changes due to the occurrence of the arc, and means independent of said switch for automatically opening said connection after the arc is extinguished.

31. A system for extinguishing arcs in electrical transmission lines comprising in combination with the transmission line, a connection for shunting an arc occurring on the line to extinguish the arc, a switch for closing said connection to extinguish the arc, means for causing the actuation of said switch responsive to abnormal current changes due to the arc, and means for causing the actuation of said switch responsive to abnormal voltage changes due to the occurrence of the arc, whereby the arc is extinguished responsive to either abnormal current changes or abnormal voltage changes due to the occurrence of the arc, and means independent of said switch for automatically opening said connection after the arc is extinguished, said switch being automatically opened upon the opening of said connection by said last mentioned means.

32. A system for extinguishing arcs or electrical transmission lines comprising in combination with the transmission line, a connection for shunting an arc occurring on the line to extinguish the arc, and means acting upon the occurrence of an arc on the line, and responsive both to voltage changes and current changes on the line due to the occurrence of the arc, to close said connection to extinguish the arc, and independent means for automatically opening the connection each time the arc is extinguished.

33. A system for extinguishing arcs on electrical transmission lines comprising in combination with the transmission line, a connection for shunting an arc occurring on the line to extinguish the arc, a switch for closing said connection to extinguish the arc, means for causing the actuation of said switch responsive to abnormal current changes due to the arc, and means for causing the actuation of said switch responsive to abnormal voltage changes due to the occurrence of the arc, whereby the arc is extinguished responsive to either abnormal current changes or abnormal voltage changes due to the occurrence of the arc, and a plurality of fuses automatically connected in circuit in said connection for opening said connection upon the extinguishing of the arc, said switch being automatically opened responsive to the opening of said connection by the burning out of one of said fuses therein.

In testimony whereof, I have signed my name to this specification, in the presence of two subscribing witnesses.

LLOYD C. NICHOLSON.

Witnesses:
A. C. STARK,
E. S. BUNDY.